(12) United States Patent
Sato

(10) Patent No.: US 8,480,239 B2
(45) Date of Patent: Jul. 9, 2013

(54) OPTICAL DEVICE AND PROJECTION DEVICE

(75) Inventor: Yuji Sato, Kanagawa (JP)

(73) Assignee: Sony Corporation (JP)

( * ) Notice: Subject to any disclaimer, the term of this patent is extended or adjusted under 35 U.S.C. 154(b) by 150 days.

(21) Appl. No.: 13/066,284

(22) Filed: Apr. 11, 2011

(65) Prior Publication Data

US 2011/0261325 A1 Oct. 27, 2011

(30) Foreign Application Priority Data

Apr. 22, 2010 (JP) ................. P2010-099274

(51) Int. Cl.
*G03B 21/28* (2006.01)
(52) U.S. Cl.
USPC ........... 353/99; 353/20; 353/30; 353/31; 353/94; 349/5; 349/9; 349/119; 345/9
(58) Field of Classification Search
USPC ........... 353/20, 81, 99, 30–31, 33–34, 37–38, 353/94, 119; 349/5, 7–9, 30, 106, 113, 138; 359/490.01, 634, 659; 345/8, 9
See application file for complete search history.

(56) References Cited

U.S. PATENT DOCUMENTS

| | | | | |
|---|---|---|---|---|
| 4,961,626 A * | 10/1990 | Fournier et al. | ............... | 359/630 |
| 6,186,629 B1 * | 2/2001 | Iwamura et al. | ............... | 353/31 |
| 6,398,364 B1 * | 6/2002 | Bryars | ............... | 353/31 |
| 6,561,652 B1 * | 5/2003 | Kwok et al. | ............... | 353/31 |
| 7,575,325 B2 * | 8/2009 | Suzuki et al. | ............... | 353/20 |
| 7,641,346 B2 * | 1/2010 | Berman | ............... | 353/81 |
| 7,967,443 B2 * | 6/2011 | Ma et al. | ............... | 353/20 |
| 8,061,844 B2 * | 11/2011 | Nagumo | ............... | 353/20 |
| 2004/0105038 A1 * | 6/2004 | Hashimoto et al. | ............... | 349/5 |
| 2006/0092096 A1 | 5/2006 | Sakashita | | |
| 2006/0285042 A1 * | 12/2006 | Chen et al. | ............... | 349/117 |
| 2007/0211218 A1 * | 9/2007 | Nitta et al. | ............... | 353/30 |
| 2008/0123056 A1 * | 5/2008 | Matsubara | ............... | 353/20 |
| 2009/0067049 A1 * | 3/2009 | Nakagawa et al. | ............... | 359/497 |

FOREIGN PATENT DOCUMENTS

| | | |
|---|---|---|
| JP | 7-104517 A | 4/1995 |
| JP | 3676266 B2 | 1/2003 |
| JP | 3740487 B1 | 2/2006 |
| JP | 2006-195267 A | 7/2006 |
| JP | 2007-279763 A | 10/2007 |

* cited by examiner

*Primary Examiner* — Georgia Y Epps
*Assistant Examiner* — Sultan Chowdhury
(74) *Attorney, Agent, or Firm* — Lerner, David, Littenberg, Krumholz & Mentlik, LLP

(57) ABSTRACT

An optical device includes multiple reflective spatial light modulation devices each of which applies an image signal to each of rays of incident light and rotates a polarization direction of each of the rays of incident light for a modulated output, multiple polarization elements each of which causes each polarization component of the rays of incident light in a specific direction to be transmitted and incident upon each of the spatial light modulation devices and reflects the polarization component in a direction rotated by each of the spatial light modulation devices, a light synthesis device which synthesizes multiple rays of reflected light to be output as one ray of image light, and a securing member which simultaneously secures each of the polarization elements in a position corresponding to each of the spatial light modulation devices. The securing member is secured to the light synthesis device.

6 Claims, 9 Drawing Sheets

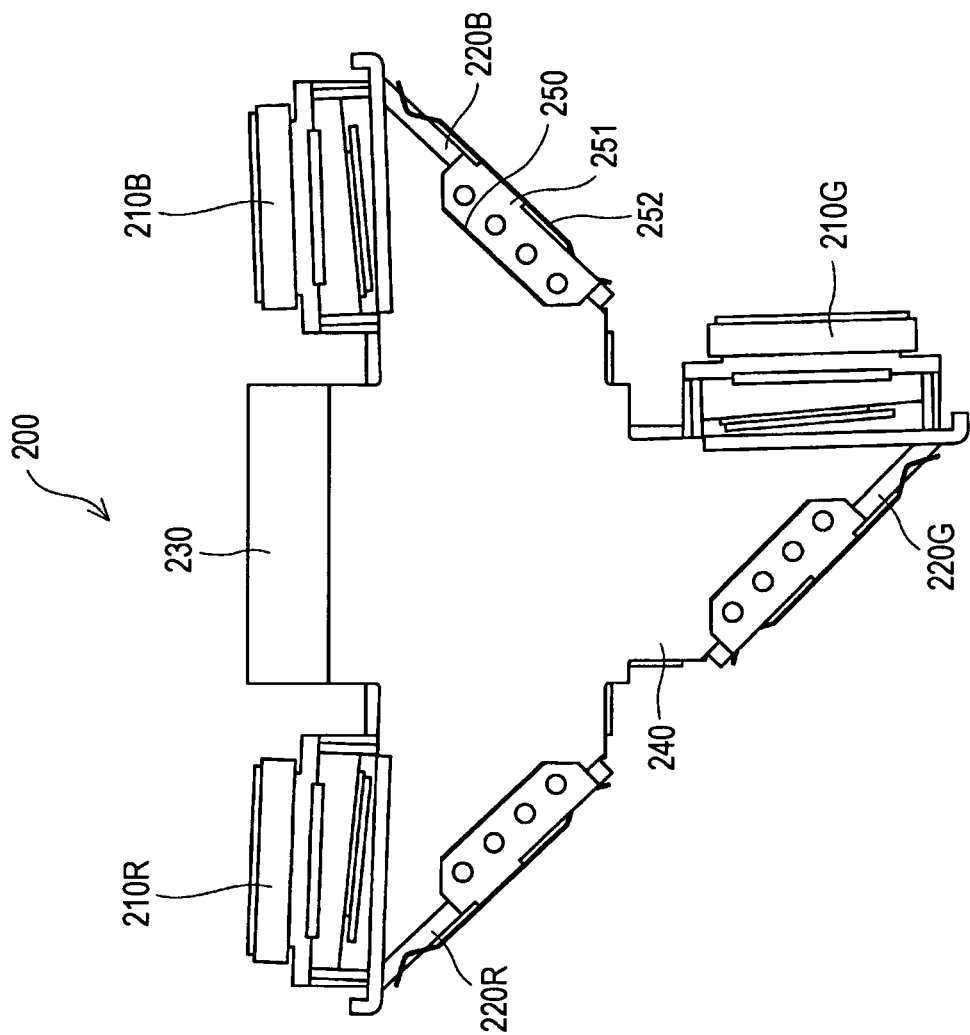

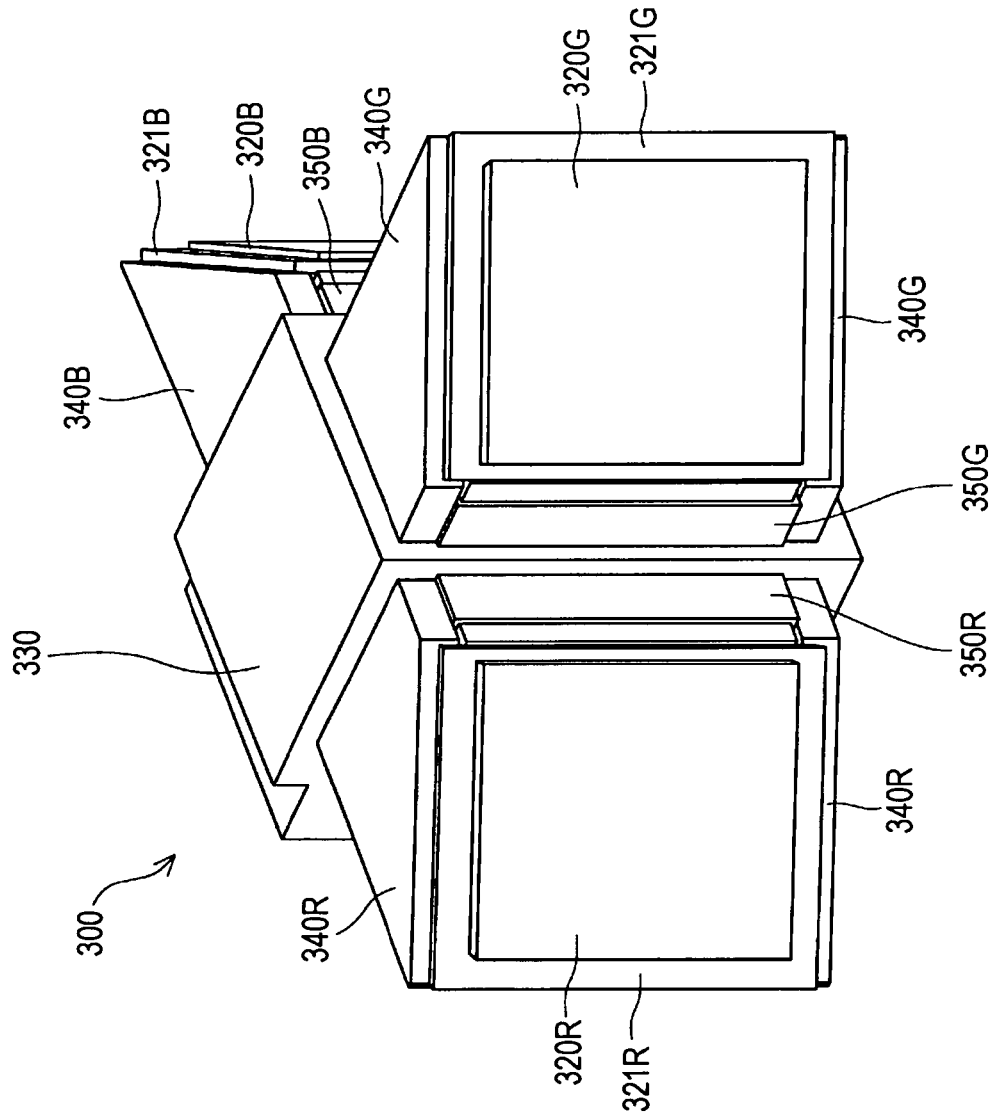

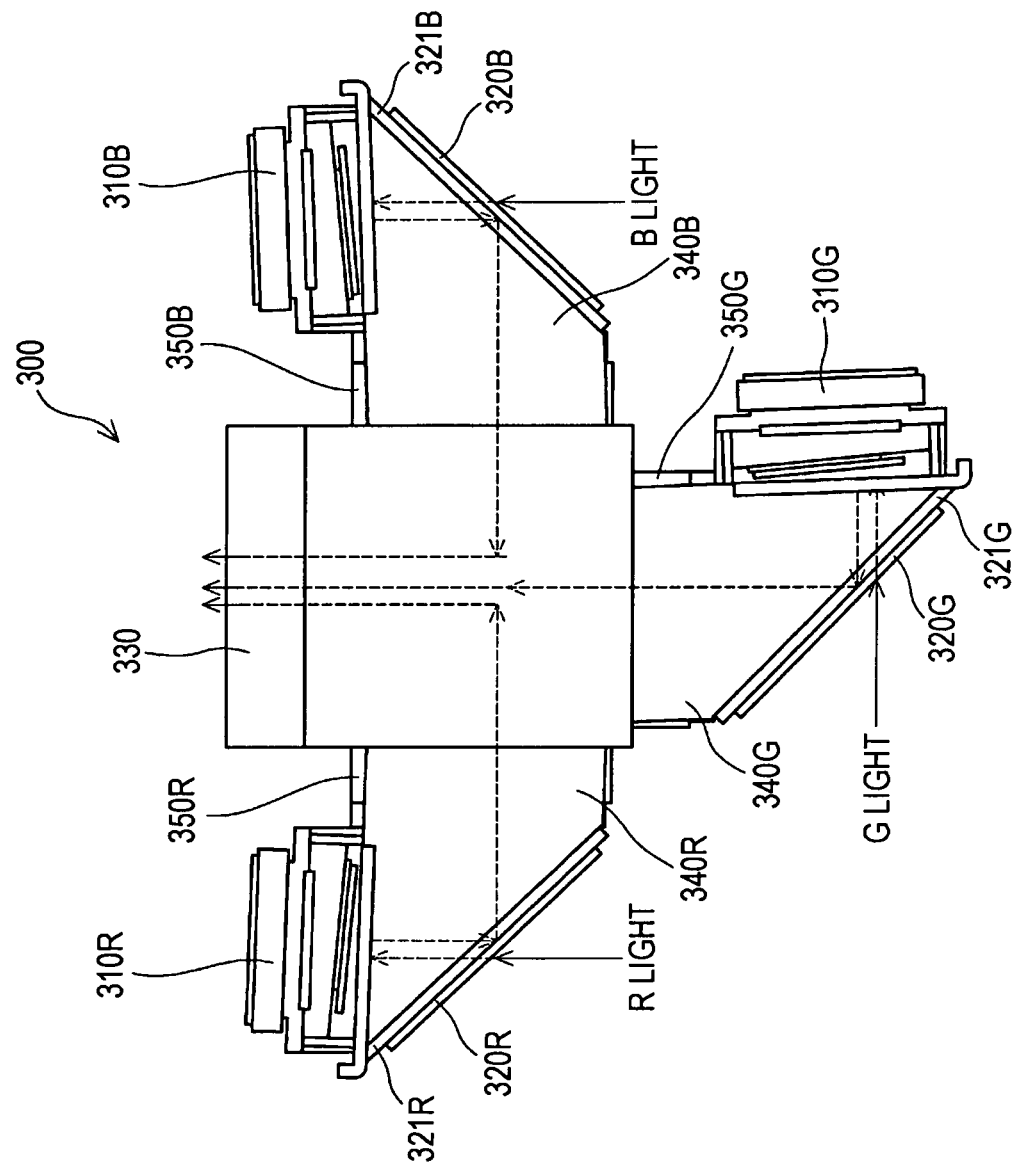

OPTICAL DEVICE AND PROJECTION DEVICE

CROSS-REFERENCE TO RELATED APPLICATION

The present application claims priority from Japanese Patent Application No. JP 2010-099274 filed in the Japanese Patent Office on Apr. 22, 2010, the entire content of which is incorporated herein by reference.

BACKGROUND OF THE INVENTION

1. Field of the Invention

The present invention relates to an optical device and a projection device including a light synthesis device which synthesizes multiple rays of reflected light reflected by multiple polarization elements to be output as one ray of image light.

2. Description of the Related Art

There has been a liquid crystal projector (projection device) including a light source unit configured of a lamp or the like supported by a reflector, an image formation unit configured to form an image, and a projection unit configured of a lens or the like which projects the image. In the image formation unit, a cross-dichroic prism (light synthesis device) which synthesizes multiple rays of reflected light reflected by multiple polarization elements to be output as one ray of image light is arranged.

Each polarization element transmits a polarization component of incident light in a specific direction so as to be incident upon a corresponding reflective liquid crystal panel and reflects each polarization component in a direction according to the rotation of the liquid crystal panel. Then, each polarization element is secured to the cross-dichroic prism each with a separate spacer plate so that respective rays of reflected light are synthesized into one ray of image light.

SUMMARY OF THE INVENTION

However, with a technique of Japanese Unexamined Patent Application Publication No. 2006-195267, it is difficult to keep each polarization element in position such that respective rays of reflected light are synthesized into one ray of image light. Specifically, there is a problem in positional accuracy between the polarization element and the spacer plate and positional accuracy between the spacer plate and the cross-dichroic prism, causing displacement at the time of assembly or misregistration which prevents one ray of image light from being formed through synthesis due to thermal expansion at the time of use.

FIG. 8 is a sectional view showing an optical device 300 for such a liquid crystal projector of the related art.

FIG. 9 is a plan view showing the optical device 300 for the liquid crystal projector of the related art.

As shown in FIGS. 8 and 9, the optical device 300 includes reflective liquid crystal panels 310R, 310G, and 310B respectively corresponding to red light (R light), green light (G light), and blue light (B light) having different wavelength bands. The optical device 300 also includes polarization elements 320R, 320G, and 320B respectively corresponding to the liquid crystal panels 310R, 310G, and 310B.

Herein, the polarization elements 320R, 320G, and 320B are secured respectively to element holders 321R, 321G, and 321B with an adhesive. Also, the element holders 321R, 321G, and 321B are secured respectively to spacer plates 340R, 340G, and 340B with an adhesive. Further, the spacer plates 340R, 340G, and 340B are bonded respectively to spacer glass 350R, 350G, and 350B, and the spacer glass 350R, 350G, and 350B are secured respectively to a cross-dichroic prism 330 with an adhesive.

In this manner, the three pieces spacer glass 350R, 350G, and 350B, the three spacer plates 340R, 340G, and 340B, and the three element holders 321R, 321G, and 321B are positional references for the polarization elements 320R, 320G, and 320B in the optical device 300. The cross-dichroic prism is used for securing and assembly. Therefore, there are many parts to be secured (parts where an adhesive is used), thus posing a problem of displacement at the time of assembly. Also, at the time of use, displacement occurs due to accumulated thermal expansion of the adhesive. As a result, occurrence of misregistration (displacement of B light in an example shown in FIG. 9) causes a decrease in the quality of an image.

Thus, it is desirable to prevent misregistration so that image quality can be improved.

Embodiments of the present invention described below address the problem described above.

According to an embodiment of the present invention, an optical device includes multiple reflective spatial light modulation devices each of which applies, with respect to multiple rays of incident light having different wavelength bands, an image signal corresponding to each of the rays of incident light and rotates a polarization direction of each of the rays of incident light for a modulated output, multiple polarization elements each of which causes each polarization component of each of the rays of incident light in a specific direction to be transmitted and incident upon each of the spatial light modulation devices and reflects the polarization component in a direction rotated by each of the spatial light modulation devices, a light synthesis device which synthesizes multiple rays of reflected light reflected by each of the polarization elements to be output as one ray of image light, and a securing member which simultaneously secures each of the polarization elements in a position such that each of the spatial light modulation devices and each of the polarization elements correspond with each other. The securing member is secured to the light synthesis device.

According to another embodiment of the present invention, a projection device includes a spatial light modulation device, a polarization element, a light synthesis device, and a securing member in a similar manner to the embodiment described earlier of the present invention as well as a light source which emits light to be incident upon each of the spatial light modulation devices and a lens to project image light output from the light synthesis device. The securing member is secured to the light synthesis device.

EFFECT

The embodiments of the present invention described above include the securing member which simultaneously secures each of the polarization elements. The securing member is secured to the light synthesis device. Therefore, each of the polarization elements is simultaneously secured to the securing member which is a positional reference, thus reducing parts to be secured (parts where an adhesive is used) between each of the polarization elements and the light synthesis device.

According to the embodiments of the present invention, there are fewer parts to be secured (parts where an adhesive is used) between each of the polarization elements and the light synthesis device. Therefore, displacement at the time of assembly and displacement due to thermal expansion of an adhesive at the time of use can be reduced significantly. As a result, misregistration can be prevented to improve image quality.

BRIEF DESCRIPTION OF THE DRAWINGS

FIG. 7 is a plan view showing the optical device for the liquid crystal projector as the optical device according to the embodiment (second embodiment) of the present invention;

FIG. 8 is a perspective view showing an optical device for a liquid crystal projector of the related art; and FIG. 9 is a plan view showing the optical device for a liquid crystal projector of the related art.

DESCRIPTION OF THE PREFERRED EMBODIMENTS

Embodiments of the present invention will be described below with reference to the drawings.

Herein, a projection device according to the embodiments of the present invention described below is a liquid crystal projector 10. Also, an optical device according to the embodiments of the present invention described below is an optical device 100 or 200 for the liquid crystal projector 10.

Note that descriptions are in the following order.

1. First embodiment (example of securing a polarization element for an optical device)
2. Second embodiment (another example of securing a polarization element for an optical device)
[Configuration Example of a Projection Device]

Figure 1:
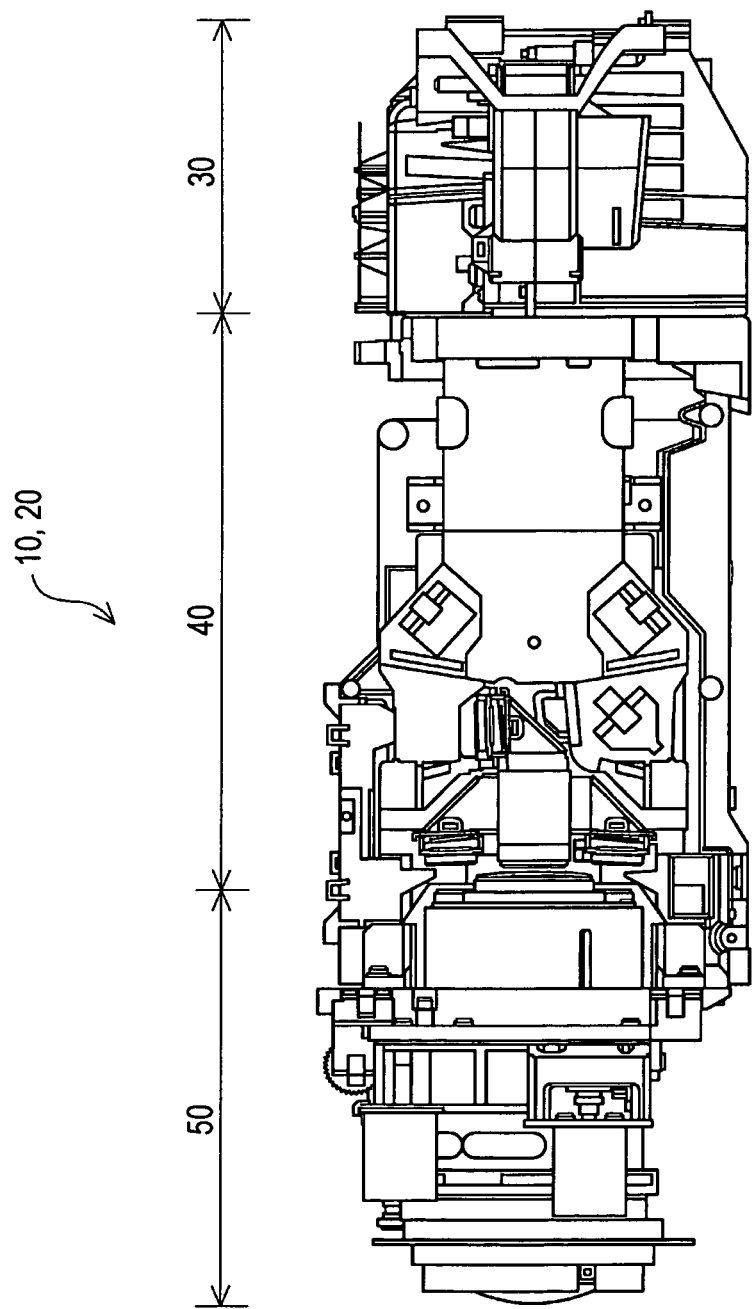
FIG. 1 is a side view showing an optical unit in a liquid crystal projector as a projection device according to one embodiment of the present invention.

FIG. 1 is a side view showing an optical unit 20 in the liquid crystal projector 10 as the projection device according to one embodiment of the present invention.

Figure 2:
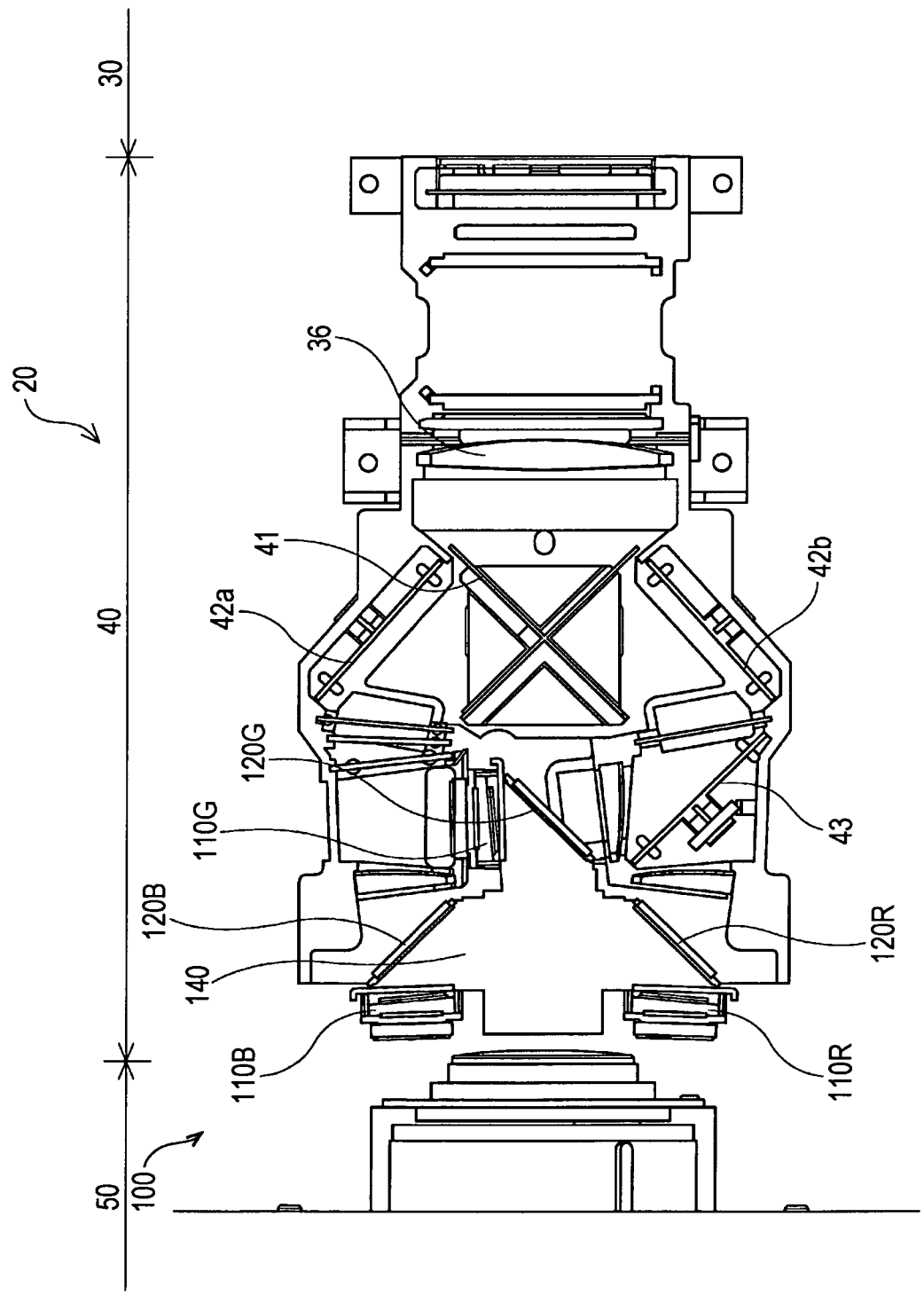
FIG. 2 is a side view showing a portion around an image formation unit of the optical unit shown in FIG. 1.

FIG. 2 is a side view showing a portion around an image formation unit 40 of the optical unit 20 shown in FIG. 1.

Figure 3:
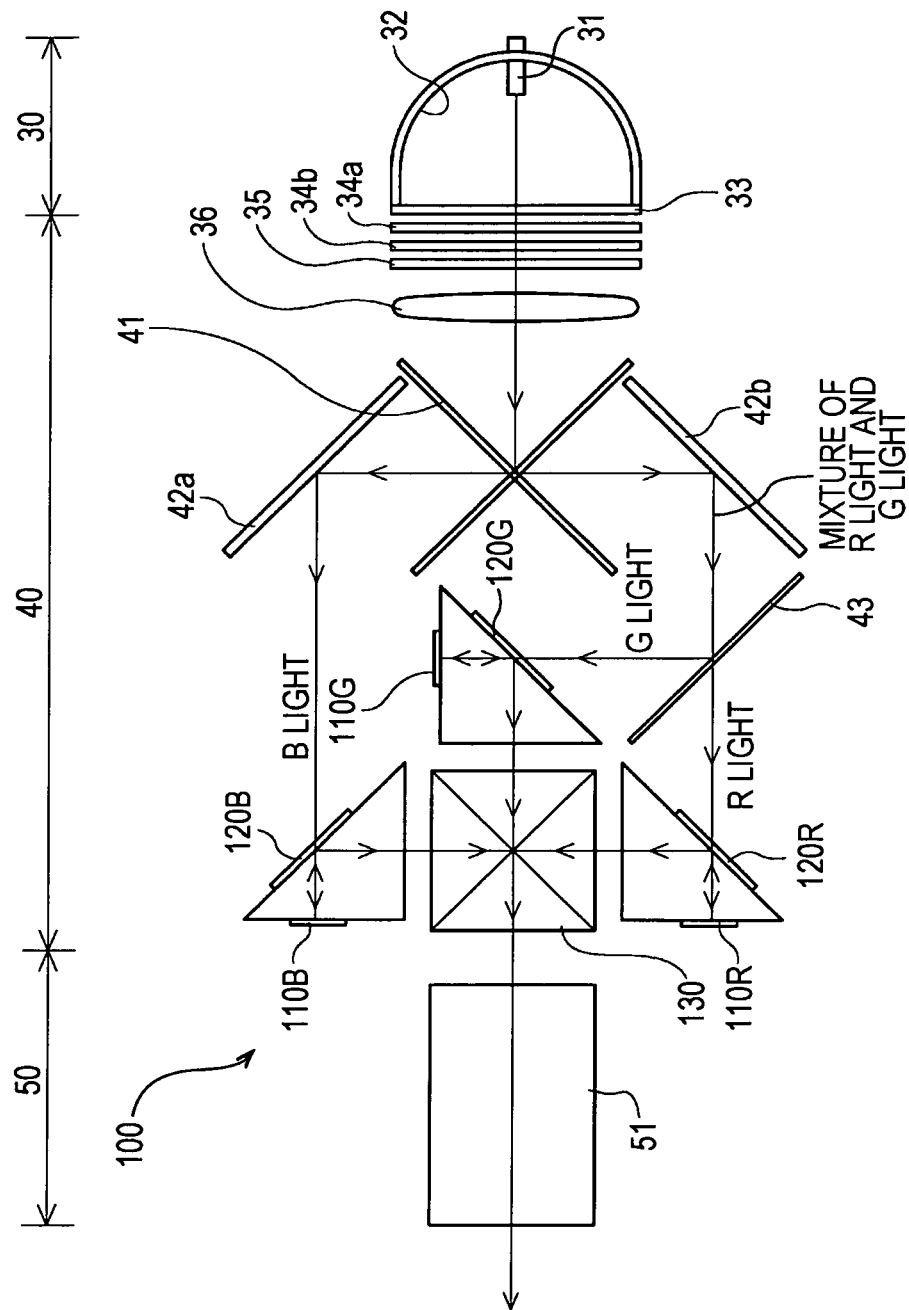
FIG. 3 is a conceptual diagram showing the configuration of the liquid crystal projector as the projection device according to the embodiment of the present invention.

Further, FIG. 3 is a conceptual diagram showing the configuration of the liquid crystal projector 10 as the projection device according to the embodiment of the present invention.

As shown in FIGS. 1 to 3, the optical unit 20 in the liquid crystal projector 10 according to this embodiment includes a light source unit 30, the image formation unit 40, and a projection unit 50.

Herein, the light source unit 30 includes a lamp 31 (corresponding to a light source according to the embodiment of the present invention), a reflector 32, and protective glass 33.

The lamp 31 is a metal halide lamp, a xenon lamp, a halogen lamp, or the like which emits unpolarized white light including red light (R light), green light (G light), and blue light (B light), for which various common lamps are suitable.

White light emitted from the lamp 31 is reflected by the reflector 32 to become parallel light and is emitted from the protective glass 33.

The image formation unit 40 includes fly eye lenses 34a and 34b, a PS conversion element 35, and a condenser lens 36.

The fly eye lenses 34a and 34b are arranged as a pair in a position apart from the protective glass 33 to even out the brightness distribution of light emitted from the protective glass 33. The PS conversion element 35 is formed of an aligned strip-shaped polarization beam splitter and a corresponding wave plate provided intermittently to convert the polarization direction. Therefore, light emitted from the condenser lens 36 enters the image formation unit 40 as parallel light aligned with a predetermined polarization (for example, p-polarization).

Further, the image formation unit 40 includes a cross-dichroic mirror 41, reflective mirrors 42a and 42b, and a dichroic mirror 43.

The cross-dichroic mirror 41 separates white light emitted from the condenser lens 36 into light (B light) having a wavelength region of blue on the short wavelength side and light (mixture of R light and G light) having a wavelength region of red and green on the long wavelength side. Then, the B light is reflected by the reflective mirror 42a, and the mixture of R light and G light is reflected by the reflective mirror 42b. Further, the G light on the short wavelength side within the mixture of R light and G light is reflected by the dichroic mirror 43, and the R light on the long wavelength side transmits through the dichroic mirror 43. Therefore, the G light and the R light are also separated.

Further, the image formation unit 40 includes the optical device 100. The optical device 100 includes reflective liquid crystal panels 110R, 110G, and 110B (corresponding to a spatial light modulation device according to the embodiment of the present invention), polarization elements 120R, 120G, and 120B, a cross-dichroic prism 130 (corresponding to a light synthesis device according to the embodiment of the present invention), and a spacer plate 140 (corresponding to a securing member according to the embodiment of the present invention).

The polarization element 120R causes R light which is p-polarized light transmitted through the dichroic mirror to be transmitted and incident upon the liquid crystal panel 110R. The liquid crystal panel 110R which displays red image information applies an image signal corresponding to the R light to rotate the polarization direction of the R light for a modulated output. The R light spatially modulated and converted to s-polarized light by the liquid crystal panel 110R is reflected by the polarization element 120R and enters the cross-dichroic prism 130.

In a similar manner, the polarization element 120G causes G light which is p-polarized light reflected by the dichroic mirror 43 to be transmitted and incident upon the liquid crystal panel 110G. The liquid crystal panel 110G which displays green image information applies an image signal corresponding to the G light to rotate the polarization direction of the G light for a modulated output. The G light spatially modulated and converted to s-polarized light by the liquid crystal panel 110G is reflected by the polarization element 120G and enters the cross-dichroic prism 130.

In a similar manner, the polarization element 120B causes B light which is p-polarized light separated by the cross-dichroic mirror 41 and reflected by the reflective mirror 42a to be transmitted and incident upon the liquid crystal panel 110B. The liquid crystal panel 110B which displays blue image information applies an image signal corresponding to the B light to rotate the polarization direction of the B light for a modulated output. The B light spatially modulated and converted to s-polarized light by the liquid crystal panel 110B is reflected by the polarization element 120B and enters the cross-dichroic prism 130.

The cross-dichroic prism 130 synthesizes the R light, the G light, and the B light which are reflected light from the polarization elements 120R, 120G, and 120B to be output as one ray of image light. Then, the image light is introduced to the projection unit 50 to be enlarged and projected on a screen via a lens mirror tube 51 including a lens for projection.

Note that the liquid crystal projector 10 may be applied not only for business purposes with relatively small magnification but also for a hall or for a theater with large magnification.

1. First Embodiment

Configuration Example of an Optical Device

Figure 4:
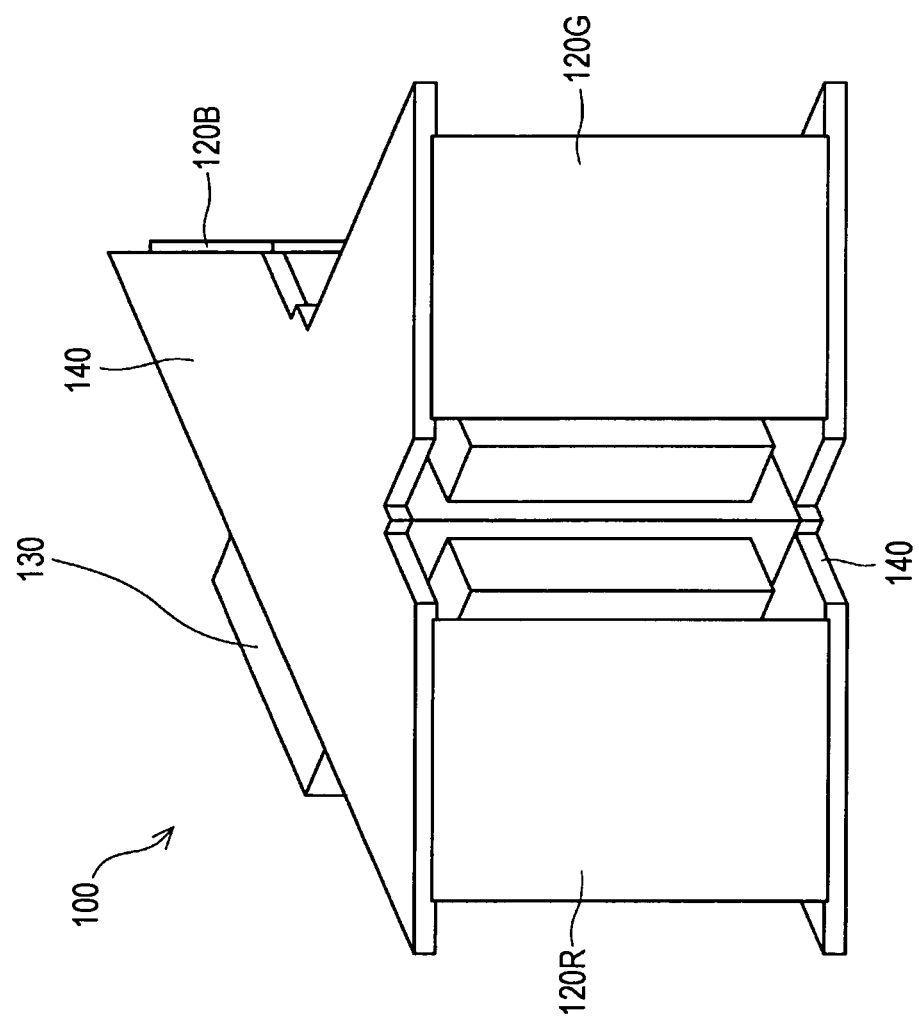
FIG. 4 is a perspective view showing an optical device for the liquid crystal projector as an optical device according to one embodiment (first embodiment) of the present invention.

FIG. 4 is a perspective view showing the optical device 100 for the liquid crystal projector 10 (see FIG. 3) as the optical device according to one embodiment (first embodiment) of the present invention.

Figure 5:
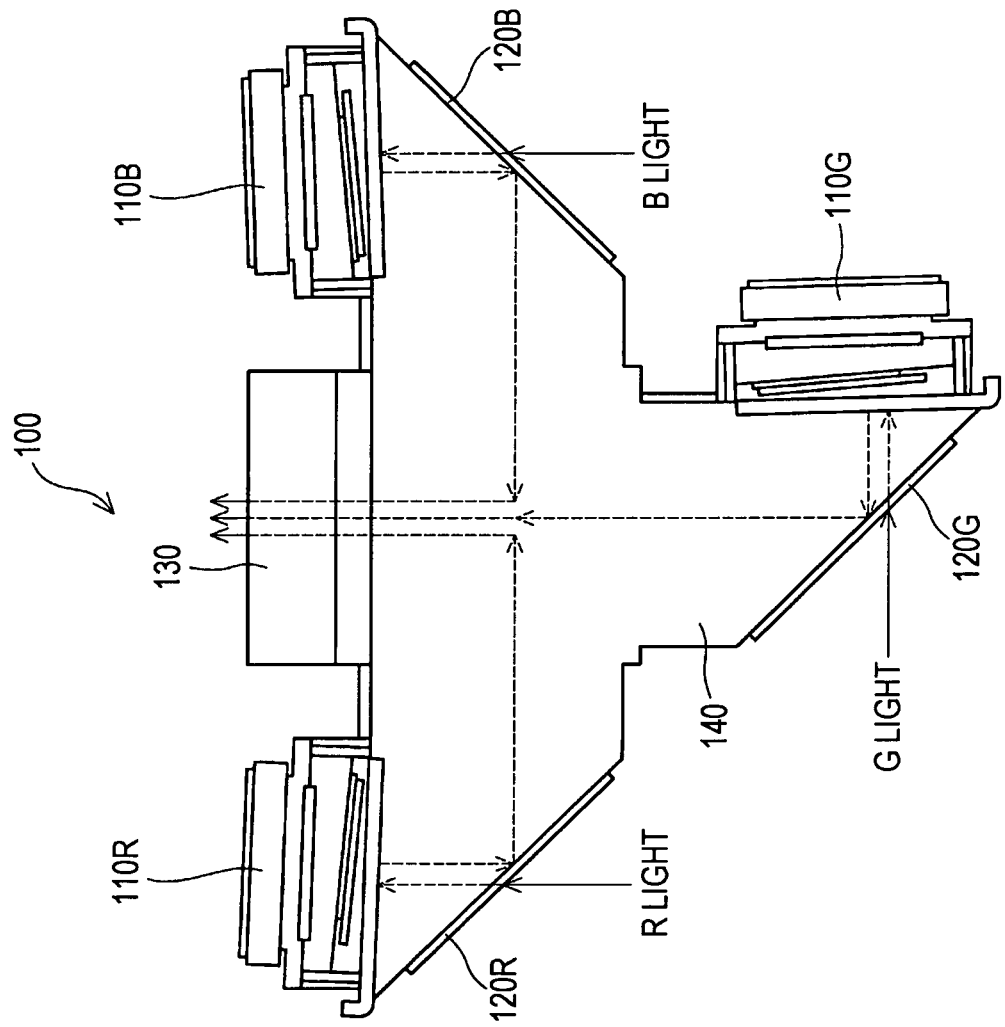
FIG. 5 is a plan view showing the optical device for the liquid crystal projector as the optical device according to the embodiment (first embodiment) of the present invention.

FIG. 5 is a plan view showing the optical device 100 for the liquid crystal projector 10 as the optical device according to the embodiment (first embodiment) of the present invention.

As shown in FIGS. 4 and 5, each of the polarization elements 120R, 120G, and 120B is directly secured with an adhesive to an end surface of a pair of upper and lower spacer plates 140 formed in a flat-plate shape.

Herein, the spacer plate 140 simultaneously secures the polarization elements 120R, 120G, and 120B in such positions that the liquid crystal panels 110R, 110G, and 110B and the polarization elements 120R, 120G, and 120B correspond with each other. The polarization elements 120R, 120G, and 120B are positional references. The pair of upper and lower spacer plates 140 are respectively secured with an adhesive to two opposing surfaces (upper surface and lower surface) of the cross-dichroic prism 130 formed in a quadrangular-prism shape.

Thus, the optical device 100 in the first embodiment shown in FIGS. 4 and 5 does not employ the element holders 321R, 321G, and 321B in the optical device 300 of the related art shown in FIGS. 8 and 9. Therefore, there are fewer parts to be secured (parts where an adhesive is used) between the polarization elements 120R, 120G, and 120B and the spacer plate 140.

Also, the optical device 300 of the related art uses the three spacer plates 340R, 340G, and 340B corresponding to the three polarization elements 320R, 320G, and 320B. However, in the optical device 100 in the first embodiment, the three polarization elements 120R, 120G, and 120B are secured simultaneously to the spacer plate 140. Therefore, there are fewer parts to be secured (parts where an adhesive is used) than between the spacer plates 340R, 340G, and 340B and the spacer glass 350R, 350G, and 350B and between the spacer glass 350R, 350G, and 350B and the cross-dichroic prism 330 in the optical device 300 of the related art.

Since there are fewer parts to be secured between the polarization elements 120R, 120G, and 120B and the cross-dichroic prism 130 in this manner, parts where an adhesive is to be used can be reduced to improve the positional accuracy at the time of assembly. Also, since the overall amount of thermal expansion of the adhesive is reduced, the positional accuracy at the time of use can be improved. As a result, misregistration is prevented to improve image quality.

Note that the spacer plate 140 is preferably formed with ceramic having a small linear expansion coefficient. Forming with ceramic can prevent influence of heat with respect to not only the adhesive but also the spacer plate 140 to significantly reduce displacement of the polarization elements 120R, 120G, and 120B due to temperature change.

Also, even if the adhesive or the spacer plate 140 has thermally expanded, the polarization element 120R and the polarization element 120G move in the same direction. Therefore, even if the temperature changes, the synthesis of the R light and the G light by the cross-dichroic prism 130 is ensured.

Although the polarization element 120B moves in an opposite direction of the polarization element 120R and the polarization element 120G, the misregistration can be prevented from being recognized visually since the B light is hardly visible.

2. Second Embodiment

Configuration Example of an Optical Device

Figure 6:
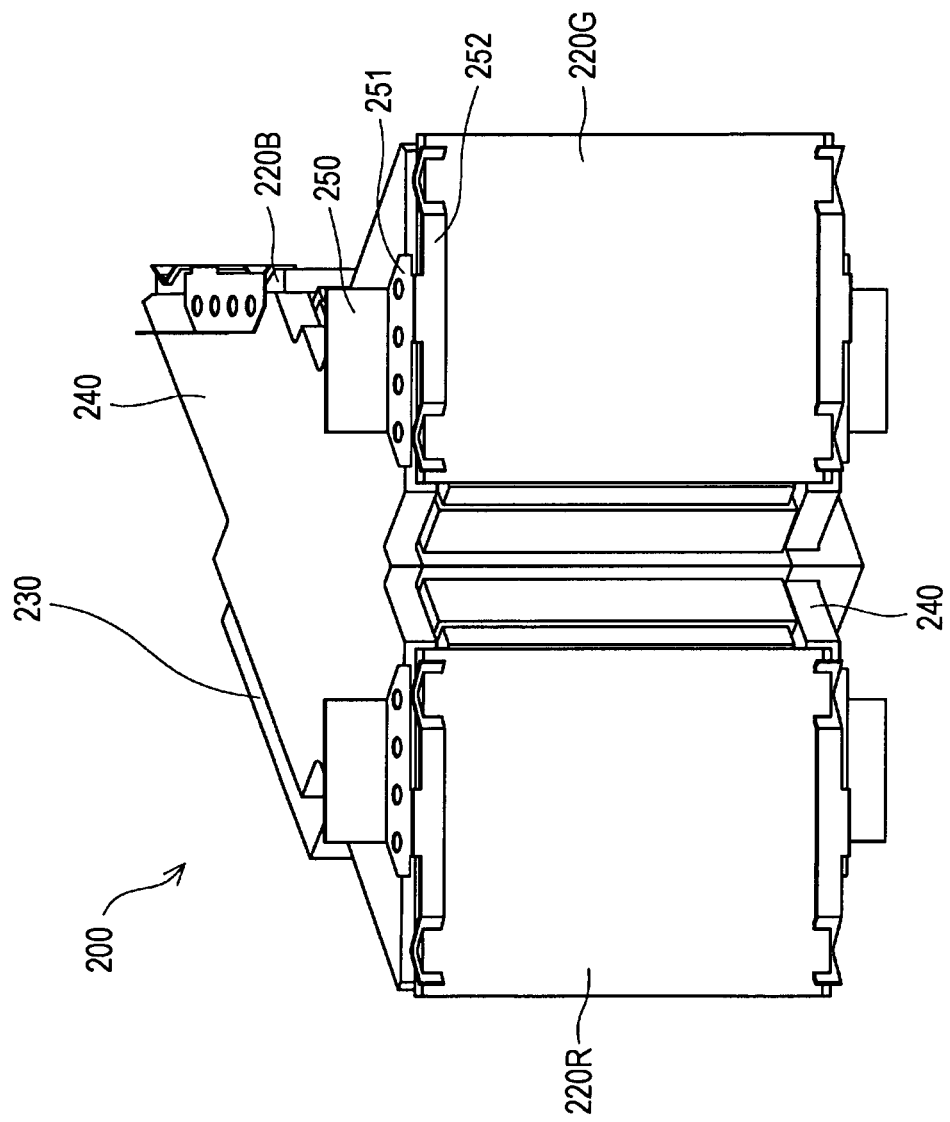
FIG. 6 is a perspective view showing an optical device for the liquid crystal projector as an optical device according to one embodiment (second embodiment) of the present invention.

FIG. 6 is a perspective view showing the optical device 200 for the liquid crystal projector 10 (see FIG. 3) as the optical device according to one embodiment (second embodiment) of the present invention.

FIG. 7 is a plan view showing the optical device 200 for the liquid crystal projector 10 as the optical device according to the embodiment (second embodiment) of the present invention.

The optical device 200 in the second embodiment shown in FIGS. 6 and 7 includes liquid crystal panels 210R, 210G, and 210B and polarization elements 220R, 220G, and 220B, in a similar manner to the optical device 100 in the first embodiment shown in FIGS. 4 and 5.

The polarization elements 220R, 220G, and 220B are each secured to an end surface of a pair of upper and lower spacer plates 240 formed in a flat-plate shape. Further, the pair of upper and lower spacer plates 240 are respectively secured to two opposing surfaces (upper surface and lower surface) of a cross-dichroic prism 230 formed in a quadrangular-prism shape.

Herein, the spacer plate 240 includes a pair of upper and lower securing clips 250 (corresponding to a pressing member according to the embodiment of the present invention) in a securing portion of the polarization elements 220R, 220G, and 220B. Each securing clip 250 includes an attachment piece 251 secured to the spacer plate 240 with an adhesive and a pressing spring 252 which presses the surface of the polarization elements 220R, 220G, and 220B. Therefore, by placing the polarization elements 220R, 220G, and 220B between the end surface (securing portion) of the spacer plate 240 and each pressing spring 252, the polarization elements 220R, 220G, and 220B can be secured simultaneously in positions corresponding to the liquid crystal panels 210R, 210G, and 210B.

Thus, in the optical device 200 in the second embodiment shown in FIGS. 6 and 7, the adhesive does not enter between the polarization elements 220R, 220G, and 220B and the spacer plate 240, as in the optical device 100 in the first embodiment shown in FIGS. 4 and 5. Therefore, parts where the adhesive is used can further be reduced to improve the positional accuracy at the time of assembly and reduce the overall amount of thermal expansion of the adhesive. As a result, misregistration is prevented to improve image quality.

The embodiments of the present invention have been described above. However, the present invention is not limited to the embodiments described above, and various modifications are possible.

For example, in the embodiment, the cross-dichroic prism 130 and the spacer plate 140 are secured with an adhesive. However, this is not limiting, and parts where the adhesive is used can further be reduced by securing the cross-dichroic prism 130 and the spacer plate 140 with a method of physical press fitting or the like without the use of an adhesive. Note that the method of physical press fitting may be applied to securing between a polarization element and a cross-dichroic prism.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device comprising:
multiple reflective spatial light modulation devices each of which applies, with respect to multiple rays of incident light having different wavelength bands, an image signal corresponding to each of the rays of incident light and rotates a polarization direction of each of the rays of incident light for a modulated output;
multiple polarization elements each of which causes each polarization component of each of the rays of incident light in a specific direction to be transmitted and incident upon each of the spatial light modulation devices and reflects the polarization component in a direction rotated by each of the spatial light modulation devices;
a light synthesis device which synthesizes multiple rays of reflected light reflected by each of the polarization elements to be output as one ray of image light; and
a securing member which simultaneously secures each of the polarization elements in a position such that each of the spatial light modulation devices and each of the polarization elements correspond with each other;
wherein the securing member is secured to the light synthesis device, and
wherein the securing member includes an upper flat-shaped plate and a lower flat-shaped plate in which each of the polarization elements are secured to both the upper flat-shaped plate and the lower flat-shaped plate.

2. The optical device according to claim 1, wherein
the light synthesis device is formed in a quadrangular-prism shape, and
each of the upper flat-shaped plate and the lower flat-shaped plate of the securing member is secured to a respective one of two opposing surfaces of the light synthesis device.

3. The optical device according to claim 1, wherein the securing member includes a pressing member with which each of the polarization elements is pressed and secured to a securing portion of each of the polarization elements.

4. An projection device comprising:
multiple reflective spatial light modulation devices each of which applies, with respect to multiple rays of incident light having different wavelength bands, an image signal corresponding to each of the rays of incident light and rotates a polarization direction of each of the rays of incident light for a modulated output;
multiple polarization elements each of which causes each polarization component of each of the rays of incident light in a specific direction to be transmitted and incident upon each of the spatial light modulation devices and reflects the polarization component in a direction rotated by each of the spatial light modulation devices;
a light synthesis device which synthesizes multiple rays of reflected light reflected by each of the polarization elements to be output as one ray of image light;
a securing member which simultaneously secures each of the polarization elements in a position such that each of the spatial light modulation devices and each of the polarization elements correspond with each other;
a light source which emits light to be incident upon each of the spatial light modulation devices; and
a lens to project image light output from the light synthesis device;
wherein the securing member is secured to the light synthesis device, and
wherein the securing member includes an upper flat-shaped plate and a lower flat-shaped plate in which each of the polarization elements are secured to both the upper flat-shaped plate and the lower flat-shaped plate.

5. The optical device according to claim 1, wherein each of the polarization elements are directly secured to both the upper flat-shaped plate and the lower flat-shaped plate with an adhesive.

6. The projection device according to claim 4, wherein each of the polarization elements are directly secured to both the upper flat-shaped plate and the lower flat-shaped plate with an adhesive.

* * * * *